United States Patent [19]

Todd

[11] Patent Number: 5,463,770

[45] Date of Patent: Oct. 31, 1995

[54] SYSTEM AND METHOD FOR CONTROLLING DATA STORAGE IN A DATA PROCESSING SYSTEM IN WHICH OBJECTS GENERATED WITHIN A LOWER LEVEL LANGUAGE PROGRAM ARE ASSOCIATED WITH MEMORY SLOTS ALLOCATED TO ANOTHER PROGRAM

[75] Inventor: Stephen J. P. Todd, Winchester, England

[73] Assignee: International Business Machines Corporation, Armonk, N.Y.

[21] Appl. No.: 400,301

[22] Filed: Mar. 6, 1995

Related U.S. Application Data

[63] Continuation of Ser. No. 95,633, Jul. 21, 1993, abandoned.

[30] Foreign Application Priority Data

Jul. 22, 1992 [GB] United Kingdom ............... 9215597

[51] Int. Cl.$^6$ ............................ G06F 13/00; G06F 12/00
[52] U.S. Cl. ..................... 395/600; 395/650; 395/700; 364/DIG. 1; 364/281.1; 364/284; 364/239.9; 364/245
[58] Field of Search ........................ 395/600, 425, 395/700

[56] References Cited

U.S. PATENT DOCUMENTS

| | | | |
|---|---|---|---|
| 5,189,733 | 2/1993 | Bennett et al. | 395/425 |
| 5,202,971 | 4/1993 | Henson et al. | 395/425 |
| 5,274,804 | 12/1993 | Jackson et al. | 395/600 |
| 5,315,709 | 5/1994 | Alston, Jr. et al. | 395/600 |
| 5,321,834 | 6/1994 | Weiser et al. | 395/600 |
| 5,392,432 | 2/1995 | Engelstad et al. | 395/600 |
| 5,398,334 | 3/1995 | Topka et al. | 395/600 |

OTHER PUBLICATIONS

Vogt, "Storage Organisation in Object–Oriented Systems: A Survey", Informationstechnik It. vol. 33, No. 4, Aug. 1991, Munchen Br, pp. 208–219. No English translation.

Ichiyoshi et al., "A New External Reference Management and Distributed Unification for KL1". New Generation Computing. vol. 7, No. 2/3, 1990, Berlin DE pp. 159–177.

Foster, "A Multicomputer Garbage Collector for a Single–Assignment Language", International Journal of Parallel Programming, vol. 18, No. 3, Jun. 1989, New York US, pp. 181–203.

*Primary Examiner*—Eddie P. Chan
*Attorney, Agent, or Firm*—Roy W. Truelson; Matthew J. Bussan

[57] ABSTRACT

A data processing system of the type in which a first program interacts with a second lower level language program is provided, the system includes a lower level language subroutine for generating objects within the second program, a memory for storing the objects, and an interface, object surrogates and surrogate references for associating the objects with one or more slots allocated to the first program. The interface is generated between the first and second programs by the first program, the interface residing within the first program. The object surrogates are then contained within the interface, each object surrogate containing an identifier for a given object. To associate one or more of the slots with a particular object surrogate, the surrogate references identifying the object surrogates are stored by the first program in those slots. During operation of the first program slots may be redefined by erasing old surrogate references and replacing them with different ones. When an object surrogate is no longer associated by any surrogate reference with any of the slots, then a high level language garbage collector informs the second program. By employing such an approach the data processing system is able to automatically keep track of objects, releasing the user from the burden of having to set up L.L.L. checking routines of his own, and further enabling the system to make much more efficient use of available memory.

10 Claims, 4 Drawing Sheets

SYSTEM AND METHOD FOR CONTROLLING DATA STORAGE IN A DATA PROCESSING SYSTEM IN WHICH OBJECTS GENERATED WITHIN A LOWER LEVEL LANGUAGE PROGRAM ARE ASSOCIATED WITH MEMORY SLOTS ALLOCATED TO ANOTHER PROGRAM

This application is a continuation of application Ser. No. 08/095,633, filed Jul. 21, 1993, now abandoned.

FIELD OF THE INVENTION

The present invention relates to a system and method for controlling data storage. In particular it relates to such a system and method in which a first program interacts with s second lower level language program and the second program generates data upon request by the first program.

BACKGROUND OF THE INVENTION

It is now commonplace for users of data processing systems to instruct such systems by means of commands entered in a high level language (H.L.L.). These H.L.L. commands are then converted by the system into a low level language (L.L.L.) set of instructions which the system can understand directly and act upon. For example a particular H.L.L. command may instruct the system to operate a L.L.L. subroutine so as to generate sets of data, hereafter referred to as 'objects', for reference by subsequent H.L.L. commands. Each object is stored in a memory location within an area o memory, hereafter referred to as an object memory, that has been allocated to the L.L.L. subroutine. Subsequently these objects can be retrieved, either directly or indirectly, by means of appropriate H.L.L. commands. This procedure is particularly useful in the area of computer graphics where L.L.L. graphics subroutines are used to generate particular graphical objects under the control. of a program written in a user-friendly H.L.L.

A series of H.L.L. commands can be strung together by a user to generate a H.L.L. user program. A first program, comprising both the user program and a run-time environment, can then be initiated. During the running of the first program, interaction with a second program, including the L.L.L. subroutine, an object memory and an object manager, may be necessary. The L.L.L. subroutine within the second program may be instructed to generate many objects. As the objects are produced and stored in the object memory they will be referenced by particular 'slots' in the first program. The term 'slot' is used here to refer to any location of storage allocated to the first program, and may for example accommodate a variable or a field within a record.

During the operation of the first program several of these objects may in fact become redundant as the references to slots are redefined by the user program. As an example, consider the following sequence of instructions that might form part of a user program:
INSTRUCTION 1 a:=sphere (1);
INSTRUCTION 2 a:=cube(2);

The variable 'a' is accommodated in a slot allocated to the first program. Instruction 1 will cause the second program to generate an object describing a sphere of radius 1 unit. At this time a reference between this 'sphere' object and the slot containing variable 'a' will be made. Instruction 2 will cause the same program to generate an object describing a cube of side length 2 units. The reference for the slot containing variable 'a' will now be changed so that that slot references the 'cube' object. Now that the variable 'a' has been redefined as referring to the cube object, the sphere object is no longer referenced by the user program and can be erased by the second program.

However a L.L.L. object cannot always be erased when a slot is redefined in the user program, as the following example will illustrate:
INSTRUCTION 1 a:=sphere (1);
INSTRUCTION 2 b:=a;
INSTRUCTION 3 a:=cube(2);

Here the variable 'a' has been redefined as in the first example, and so it may appear reasonable for the second program to erase the sphere object so as to free space in the object memory. However the user program variable 'b' was set equal to the variable 'a' before 'a' was redefined, and so 'b' still references the sphere object. Thus the sphere object should not be erased at this time.

Hence it is apparent that a problem exists in how to reliably inform the second program that particular objects are of no further use to the first program, so that the second program can decide whether to erase the objects in question in order to free valuable memory space in the object memory for storage of subsequent objects.

Typically the first program will provide means, known in the art as a 'garbage collector' for monitoring data resident in H.L.L. memory and erasing such data when it is no longer referenced by the first program. The object manager in the second (low level language) program is less likely to have a garbage collector but may in certain circumstances. For example if the second program contains internal references between the L.L.L. objects in addition to references from the first program to the objects then the object manager will itself include a garbage collector. In this case the object manager will not erase at. object as soon as it is informed that the first program has no further use for that object. Instead the object will only be erased when the L.L.L. garbage collector knows that the first program has lost interest in the object AND the second program has no internal references to the object. For the purpose of the present invention it does not matter whether the L.L.L. object manager has a garbage collector or not.

In the prior art systems the H.L.L. garbage collector runs in its intended manner and erases slots when the first program has no further use for them. However in the L.L.L. the second program runs under the control of the first program, and therefore the L.L.L. object manager must be informed of the circumstances prevailing in the first program before it can reliably erase L.L.L. objects, since it has no means of knowing independently when objects have become redundant. In such prior art systems it has been usual for the H.L.L. user to keep track of the use of all L.L.L. objects generated and explicitly to erase them when they are no longer needed. This has been done by means of a specific instruction from the user to the L.L.L. object manager provided within the system, this command indicating that the first program has lost interest in the object.

Obviously in such simple cases as those illustrated above it is easy for the user to keep track of objects and to free up memory by direct commands when objects are no longer needed. However where complex sharing of the L.L.L. objects within the first program occurs, as for example is the case in many of today's graphical systems, it presents a considerable burden on the system user, and indeed it becomes impractical. for the user to monitor all uses of the objects. The user is forced to use low level programming techniques, such as the explicit programming of use counts, to manage the L.L.L. objects, but this proves to be very labor intensive.

SUMMARY OF THE INVENTION

It is an object of the present invention to provide a system in which the management of references to L.L.L. objects by the first program is performed by the system so that the L.L.L. object manager is automatically formed by the first program when the first program has no further use for particular L.L.L. objects.

Accordingly the present invention provides a data processing system of the type in which a first program interacts with a second lower level language program, the system comprising means for generating objects within the second program, a memory for storing the objects, and means for associating the objects with one or more slots allocated to the first program, characterized by: an interface generated between the first and second programs by the first program, the interface residing within the first program; an object surrogate contained within the interface, in which an identifier for a given object is stored; a surrogate reference stored by the first program in one or more of said slots, the surrogate reference associating such slots with the object surrogate; and means for informing the second program when the object surrogate is no longer associated by any surrogate reference with any of said slots.

The present invention has the technical effect that the data processing system is able to operate with less memory (for a given amount of programming effort) than was required by equivalent prior art systems.

The slots can be any area of storage allocated to the first program, but in preferred embodiments they are areas of storage allocated to the first program that are accessible either directly by a variable or indirectly via other slots which accommodate variables, Typically the slots will accommodate variables of the first program but may also accommodate fields within a data record, array, linked list, hash table or other data construction of the first program.

The second program can include any program running under control of the first program, but in preferred embodiments the second program includes a graphics program.

The identifier contained in the object surrogate can be any unique identifying information from which the second program will be able to identify the object. In preferred embodiments the identifier will be the memory address of the object.

There are several possible ways in which the informing means could inform the second program when an object surrogate is no longer associated by any surrogate reference with any of said slots, but in preferred embodiments the informing means informs the second program by sending the identifier within the object surrogate to an object manager resident within the second program. Typically the informing means will then erase the unassociated object surrogate.

As mentioned earlier the object manager may or may not implement a garbage collector of its own. In preferred embodiments the object manager does implement a garbage collector, and erases the object corresponding to the unassociated object surrogate only when that object is no longer referenced by other objects within the L.L.L. memory.

Viewed from a second aspect the present invention provides a method of controlling data storage in a data processing system of the type in which a first program interacts with a second lower level language program, the method comprising the steps of generating an object within the second program, storing the object in the memory, and associating that object with one or more slots allocated to the first program, characterized by the steps of: generating an interface between the first and second programs, the interface being accessible by the first program; creating an object surrogate within the interface that contains an identifier for the object; for each said slot, creating a surrogate reference in the first program, the surrogate reference associating the slot with the object surrogate; redefining one said slot and altering the corresponding surrogate reference so that it associates that slot with a new object surrogate; and informing the second program when the object surrogate is no longer associated by any surrogate reference with one of said slots.

BRIEF DESCRIPTION OF THE DRAWINGS

The present invention will be described further, by way of example only, with reference to an embodiment thereof as illustrated in the accompanying drawings, in which.

DETAILED DESCRIPTION OF THE PREFERRED EMBODIMENT

The present invention is applicable to data processing systems which can provide a high level language having a garbage collecting routine; some such high level languages are Prolog, Smalltalk, Oryx, and ESME. These languages are in contrast to low level languages such a 'C' or 'Fortran' where storage management is explicitly handled by the programmer. For simplicity n the preferred embodiment we will assume that the high level language is ESME, although the techniques described are generally applicable. Several L.L.L. subroutine packages are available which can be called from ESME, typical examples being 'Phigs' 'Xwindows', 'Image Assistant' and 'Winsom90'. In the preferred embodiment we shall assume that the L.L.L. subroutine package is 'Winsom90'.

Figure 1:
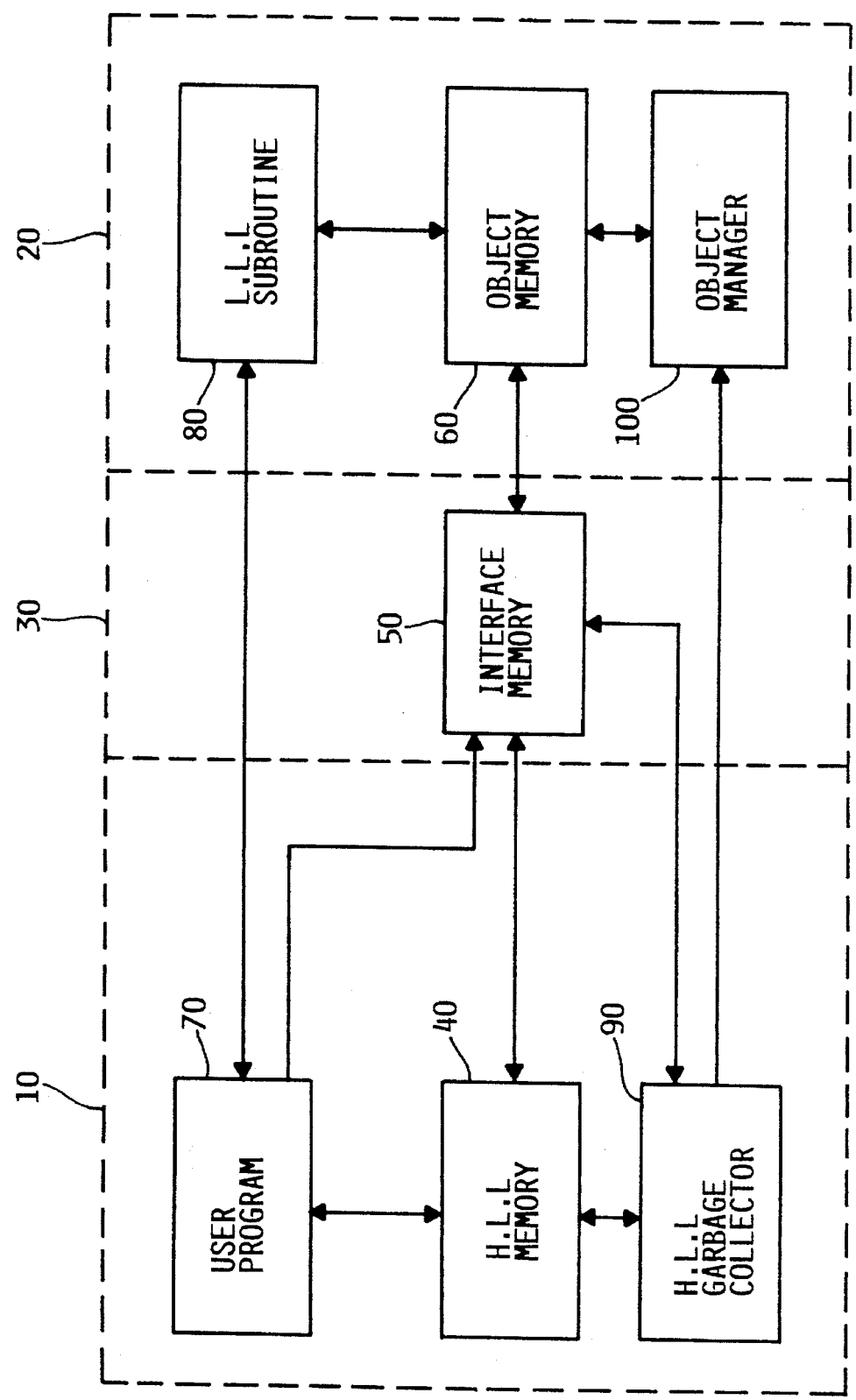
FIG. 1 is block diagram of a system in accordance with a preferred embodiment of the present invention.

FIG. 1 shows part of a data processing system which incorporates the preferred embodiment of the present invention. The user program 70, in operation, generates variables which it accommodates in particular memory allocations, hereafter referred to as 'slots' 150, held in H.L.L. memory 40 allocated to the first program 10. At certain points the user program 70 will make a call to the second program 20 via the interface 30, asking the second program 20 to generate and store a particular object 200. The L.L.L. subroutine 80 within the second program 20 will then produce the required object 200, store that object in the object memory 60, and return an identifier for the object to the interface 30. A special kind of slot, hereafter referred to as an object surrogate 250, is then generated by the interface 30 within an area of memory allocated as interface memory 50. The identifier is then stored in the object surrogate 250, this identifier typically being the address information for the memory location in the object memory 60 that contains the object 200.

To reference the object surrogate 250 from the relevant slot 150, a surrogate reference 300 is created and stored in a field within that slot 150. The surrogate reference 300 will be an identifier for the object surrogate 250, typically the address information for tile memory location when the interface memory 50 that contains the object surrogate 250. If a different variable is then associated with the same object 200 all that is required is to copy the surrogate reference 300 that already references the relevant object surrogate 250. In this way many copies of the surrogate reference 300 can be created referencing different slots 150 to one particular object surrogate 250. However there is always only one object surrogate 250 in the interface 30 referencing any particular object 200 in object memory 60.

Figure 2:
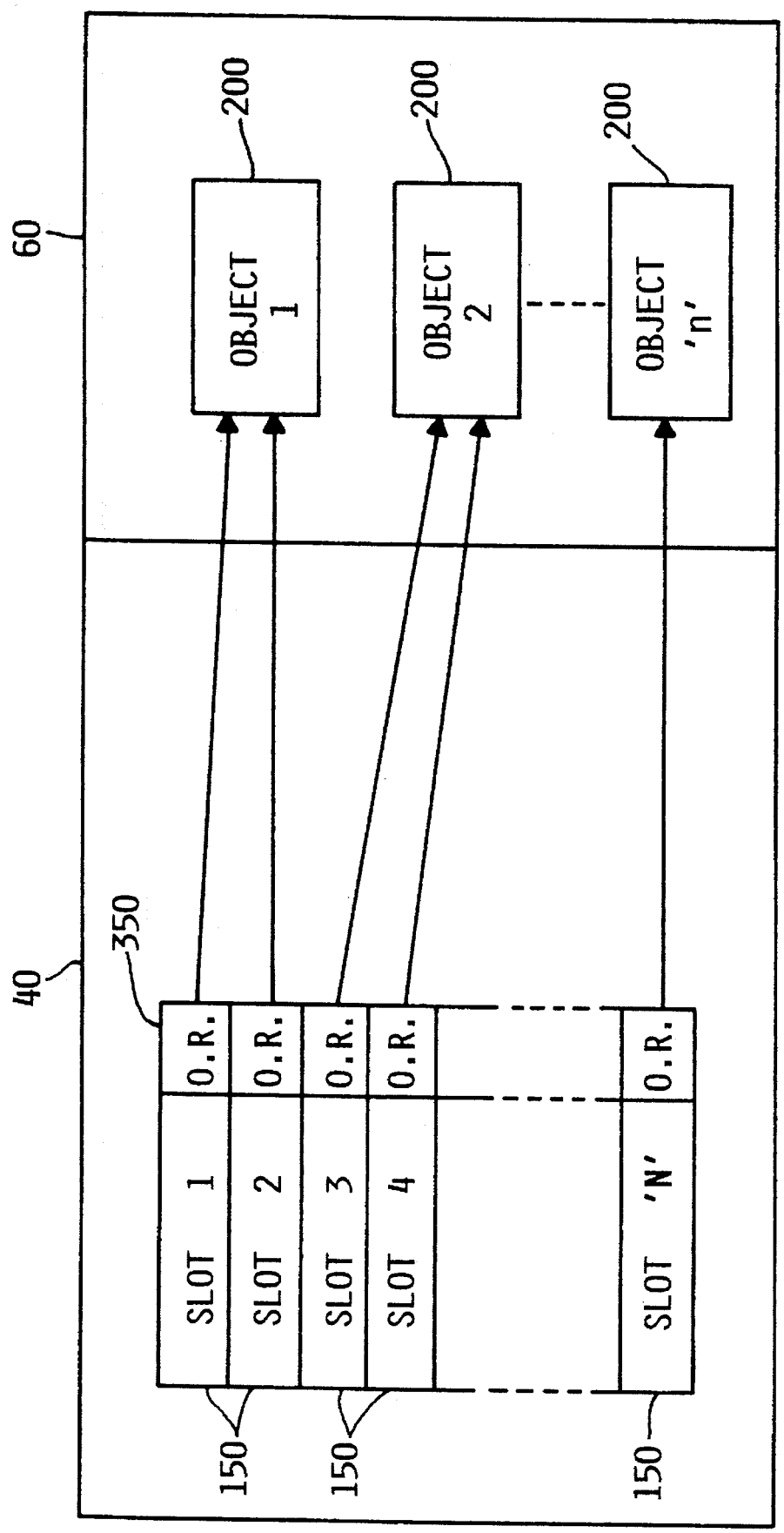
FIG. 2 illustrates the the manner in which slots and objects are referenced in a typical prior art system.

We will now consider the way in which slots and objects are referenced in a typical prior art system as illustrated in FIG. 2. Consider the situation in which the first program 10 requests that the L.L.L. subroutine 80 generates an object 200 called 'OBJECT 1', which it wishes to reference from a particular variable stored in 'SLOT 1' The L.L.L. subroutine 80 will generate 'OBJECT 1' and store it in object memory 60. It will then return an object reference 350 to the first program 10 which the first program will store in a field within 'SLOT 1'. If the variable in 'SLOT 2' is also to be associated with 'OBJECT 1' then the same object reference 350 will be stored within 'SLOT 2' This is illustrated in FIG. 2 by the two arrows joining SLOTS 1 and 2 with 'OBJECT 1'.

By a similar process 'SLOT 3' and 'SLOT 4' may be referenced to 'OBJECT 2' as shown in FIG. 2, and further slots may be referenced to a number of further objects; there is no limit on the number of slots that can reference any particular object. During operation of the user program 70 several of the variables may need to be redefined. As an example consider the case in which the variable 'SLOT 1' needs to be redefined so as to be associated with 'OBJECT 2' The first program 10 will erase the original object reference in 'SLOT 1' and replace it with an object reference identical to those in SLOTS 3 and 4. The H.L.L. garbage collector 90 will become aware of this alteration and is in a position to inform the object manager 100 of the second program 20 that such n event has arisen. However it is not in a position to indicate that the first program has lost interest altogether in 'OBJECT 1'. Indeed the variable in 'SLOT 2' is still referencing 'OBJECT 1' and so it would be wrong for the object manager 100 to erase 'OBJECT 1' from object memory 60 at this time.

Hence we can see that there is a major problem with the prior art, namely that the H.L.L. garbage collector 90 of the first program 10 is not able to reliably inform the second program 20 as to whether the first program 10 has lost interest in a particular L.L.L. object 200. The user is forced to employ low level language techniques, such as counting the number of times that an object is used, in order to keep track of objects 200. Further, when an object 200 has become redundant, the user has to make explicit calls to erase that object 200 from the object memory 60.

Figure 3:
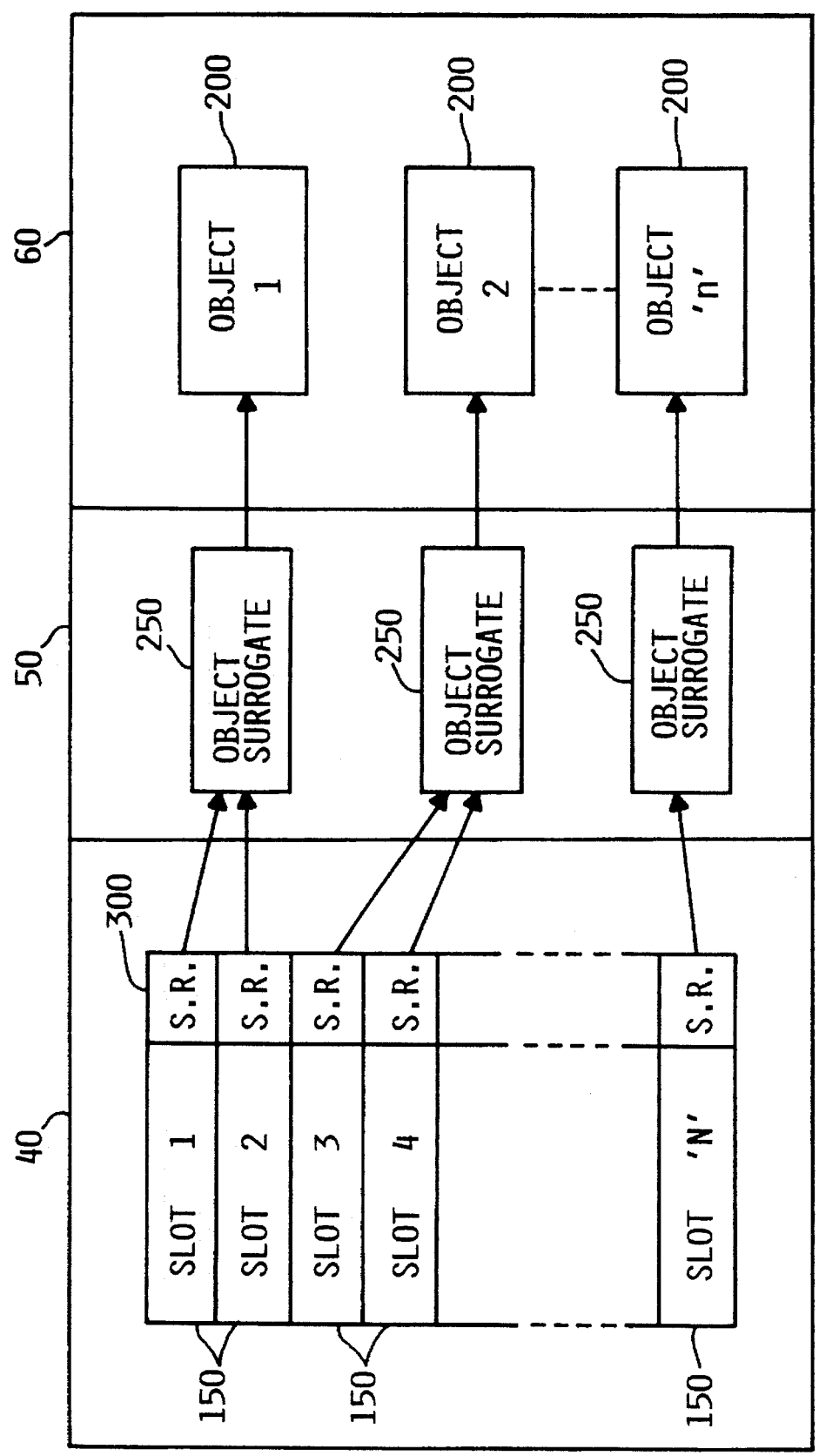
FIG. 3 illustrates the manner in which slots, object surrogates and objects are referenced in the preferred embodiment of the present invention.

The system of the preferred embodiment overcomes these difficulties as will be apparent from the following discussion based on FIG. 3. As in the prior art the L.L.L. subroutine 80 will generate 'OBJECT 1' and store it in the object memory 60. However when the L.L.L. subroutine 80 returns the object reference it will not be stored within a field of 'SLOT 1' as was the case in the prior art. Instead the interface 30 will create a special kind of slot, hereafter referred to as an object surrogate 250, in which the object reference will be stored. Then the interface 30 will return identifying information, hereafter referred to as a surrogate reference 300, for the object surrogate 250 to the first program 10. This surrogate reference 300 will be stored in a field within 'slot 1', slot 1 having already been formed in advance by the first program 10. Typically the surrogate reference 300 will be address information for the object surrogate 250.

If the variable accommodated in 'SLOT 2' is also to be associated with 'OBJECT 1', then a copy of the surrogate reference 300 in 'SLOT 1' is stored within a field in 'SLOT 2' Similarly SLOTS 3 and 4 can be referenced to 'OBJECT 2' via a different object surrogate 250 that contains the object reference for 'OBJECT 2' By such an approach any number of slots 150 can be referenced to a particular object 200 via a single object surrogate 250 stored in interface memory 50.

Since the interface 30 is accessible by the first program 10 the H.L.L. garbage collector is able to monitor the interface memory 50 in addition to the H.L.L. memory 40. Hence as a variable becomes redundant the H.L.L. garbage collector can erase the appropriate slot 150, and further can erase object surrogates 250, which are equivalent to slots, when they are no longer referenced, by any slots 150. This is a standard part of a garbage collector's job.

However much more importantly, the H.L.L. garbage collector 90 is now able to determine when the first program 10 has lost interest in any particular object 200, since such an event occurs whenever an object surrogate 250 is left unreferenced. When an unreferenced object surrogate 250 is found by the H.L.L. garbage collector 90 the object reference can b returned to the object manager 100 and the object surrogate erased by the H.L.L. garbage collector 90. The object manager 100 can use the object reference to identify the object 200 which is of no more interest to the first program 10 and can act accordingly. If there are no internal references between L.L.L. objects in the second program, and the object manager 100 therefore is not using a garbage collector, the object 200 in question can be erased at this time to free up object memory 60. If, however, there are internal references and a garbage collecting routine is in operation, the object manager 100 will only erase the object in question when it also knows that there are no internal references to that object from other L.L.L. objects.

Figure 4:
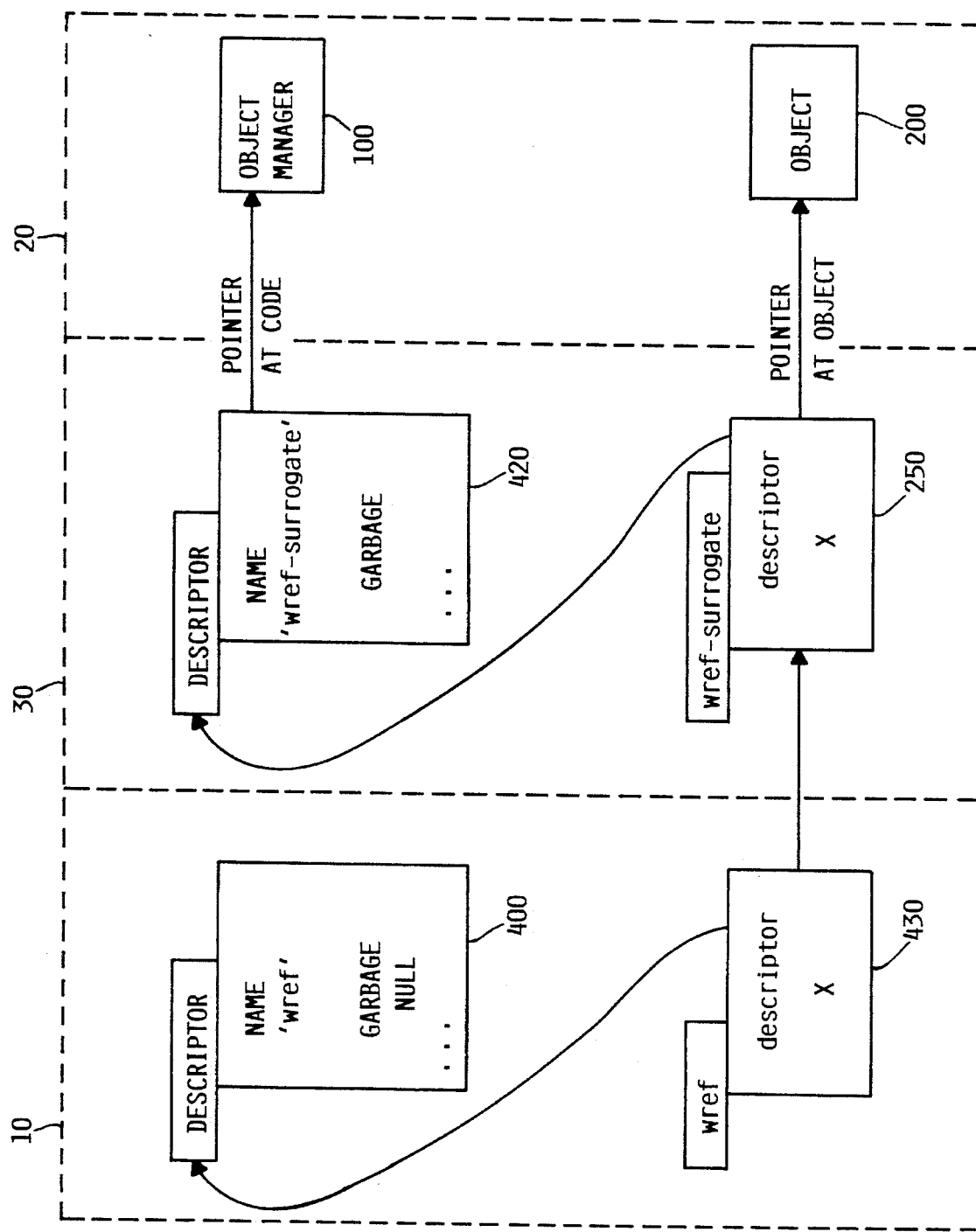
FIG. 4 illustrates the manner in which the interface is constructed in the preferred embodiment.

The manner in which the interface is constructed in the preferred embodiment will now be discussed with reference to FIG. 4. Firstly, the builder of the interface, typically a person or perhaps a higher level program, defines the interface using the following example:

type user=W_ref, esme=wref, garbage=w9ndecre; W_ref w9msphere(float radius);

The first, or 'type' line is in special ESME interface definition format. The term 'user=W_ref' means that the type W_ref used by the subroutine package (in this case Winsom90) is to be made available to the interface. W_ref is a type understood in C programs and is thus referred to as a 'C type' The term 'esme=wref' means that Winsom90 objects of C type 'W_ref' are to be viewed as ESME objects of ESME type 'wref' Finally the term 'garbage=w9ndecre' defines the name of the Winsom90 object manager 100 for objects of type 'W_ref' to be 'w9ndecre' This is to be called when ESME detects during garbage collection that it has lost all references to some 'W$_r$_ref' object.

One type line definition is needed for each C type in Winsom90 that is to be understood by ESME.

The second line of the example is a function definition line and is a standard C prototype definition. It means that the function 'w9msphere' takes as a parameter a floating point number called 'radius', and returns a result of type 'W_ref'. One function definition line is required for each function in the subroutine package (Winsom90) that is to be accessed by ESME.

The above definition of the interface is then presented to an interface generator (a program) which uses it to generate three fragments of C code representing the interface; these are then compiled and linked with the ESME interpreter (the run-time environment of the H.L,L.) and the L.L.L. subroutine package 80. The three fragments of code are used as follows:

1. The first fragment is used to generate an ESME descriptor object 400, that defines the ESME type 'wref' with a single field 'x' of type pointer to 'wref_surrogate' (ie. 'x' will contain a value which points to a 'wref_surrogate' location). The 'garbage' field of this descriptor object 400 is set to 'NULL' to indicate that no special action is to occur when an ESME object of type 'wref2 is garbage collected. This descriptor generation code is called once at system initialization.

2. The second fragment of code is used to generate an ESME descriptor object 420, that defines the ESME type 'wref_surrogate' with a single field 'x' of C type 'W_ref'. The 'garbage' field of this descriptor object 420 is set to point at the function 'w9ndecre' to indicate that, when an ESME object of type 'wref_surrogate' is garbage collected, the function 'w9ndecre' is to be called with the parameter of type 'W_ref' held in the 'x' field of the 'wref_surrogate' object. This descriptor generation code is called once at system initialization.

3. The third fragment of code is the Interface function code 'w9msphere_interface' that:
   a. Accepts the radius in ESME format.
   b. Converts the radius to C format.
   c. Calls the Winsom90 function 'w9msphere' with the converted radius as parameter, and accepts a return value of C type 'W_ref'.
   d. Creates an ESME object surrogate 250 of type 'wref_surrogate' and fills its 'x' field with the 'W_ref' returned from 'w9msphere' (The 'descriptor' field of this ESME object surrogate 250 is set by ESME to point at the ESME descriptor object 420 that defines 'wref_surrogate' objects).
   e. Inserts an identifier to the 'wref-surrogate' object surrogate 250 into the 'x' field of an ESME object 430 of type 'wref'. This 'wref' object 430 is created in advance by the first program 10 for storage in a slot 150. (The 'descriptor' field of this ESME object 430 is set by ESME to point at the ESME descriptor object 400 that defines 'wref' objects).

This interface code is called each time a user's ESME program 70 calls the ESME function 'w9msphere'. Similar interface code is generated for each other function in the subroutine package that is to be accessed by ESME, and has hence been defined in a function definition line. It is worth noting at this time that the 'wref' descriptor object 400 is stored in H.L.L. memory 40 but generated by the interface 30, and 'wref' ESME objects 430 are created by the first program 10 but have the 'x' field set by the interface 30, whilst conversely the 'wref-_surrogate' descriptor object 420 and any 'wref_surrogate' ESME objects 440 are stored in interface memory 50 but are controlled by the H.L.L. garbage collector 90.

In addition to these features of the interface generator, two changes are necessary to permit the ESME system (first program 10) to incorporate remote garbage collection. These changes are made just once and no further action is required for each new type or function incorporated into ESME. The changes are as follows:

1. ESME descriptor objects have an extra field 'garbage' added of C type pointer to function. This field is initialized to NULL when a new type is defined.

2. The ESME (H.L.L.) garbage collector 90 has to be altered to monitor this 'garbage' value. When any ESME object is garbage collected, the garbage collector follows the 'descriptor' feed that is contained at the head of every ESME object to locate the ESME descriptor object that defines the type of the ESME object being garbage collected. If the 'garbage' field of the descriptor object j.s NULL, as it will be for a 'wref' object 430 or indeed for any internal ESME object such as a string or a floating point number, then the object is disposed of and no other action is taken. If on the other hand the 'garbage' field has a non-NULL value, as will be the case for a object surrogate 250 such as a 'wref_surrogate', then the appropriate object manager 100 as referenced by the garbage field (in the case of a 'wref_surrogate' the function 'w9ndecre') is called before the object surrogate 250 is itself disposed of.

The extra lines of code added to the ESME (H.L.L.) garbage collector 90 in order to effect these changes are as follows:

```
\* garbage collect ESME objected pointed at by pointer e
*\void gfun();
gfun=e→descriptor→garbage;
if (gfun!=NULL) efun(e→x);
```

By utilizing the above technique the system of the preferred embodiment is able to automatically keep track of L.L.L. objects, releasing the user from the burden of having to set up L.L.L. checking routines of his own, and further enabling the system to make much more efficient use of available memory.

What is claimed is:

1. A data processing system in which a first high level program interacts with a second lower level language program, the system having means for generating objects within the second program, said system comprising:

a high level language memory having memory allocation slots accessible by and allocated to the first program;

an object memory for storing the objects, said objects memory being accessible by and allocated to the second program;

means for associating the objects stored in said object memory with said memory allocation slots, said associating means comprising:

(a) an interface in communication with the first and second programs, the interface residing within the first program and having access to an interface memory;

(b) an object surrogate contained within said interface memory, said object surrogate including an identifier for a given one of the objects stored in said object memory to be associated with one or more of said memory allocation slot; and (c) a surrogate reference stored by the first program in said one or more of said memory allocation slots, the surrogate reference associating said one or more memory allocation slots with the object surrogate; and informing means, in communication with said second program and having access to said interface memory and said high level language memory, for determining if the object surrogate is no longer associated by any surrogate reference with any said memory allocation slots, for informing the second program of said identifier in said object surrogate when the object surrogate is no longer associated by any surrogate reference with any of said memory allocation slots, and for erasing the unassociated object surrogate.

2. The system as claimed in claim 1, wherein the second program includes a graphics program.

3. The system as claimed in claim 1, wherein the memory allocation slots accommodate variables generated by the first program, and wherein said memory allocation slots are accessible by said variables.

4. The system as claimed in claim 1, wherein the memory allocation slots accommodate fields within a data record of the first program.

5. The system as claimed in claim 1, wherein the identifier is a memory address for the given object.

6. The system as claimed in claim 1, wherein the informing means informs the second program by sending the identifier within the object surrogate to an object manager resident within the second program.

7. The system as claimed in claim 6, wherein the informing means further erases the unassociated object surrogate.

8. The system as claimed in claim 6, wherein the object manager implements a garbage collector and erases the object corresponding to the unassociated object surrogate only when the garbage collector determines that object is no longer referenced by any other of the objects within the object memory.

9. A method of controlling data storage in a data processing system in which a fast high level program interacts with a second lower level language program, the method comprising the steps of:

generating objects within the second program;

storing the objects in an object memory, the object memory being accessible by and allocated to the second program; and associating the objects stored in the object memory with memory allocation slots in a high level language memory, wherein said memory allocation slots are accessible by and allocated to the first program, wherein said associating step comprises the steps of:

(a) generating an interface in communication with the first and second programs, the interface residing within the first program and having access to an interface memory;

(b) creating a plurality of object surrogates within the interface and storing the object surrogates in the interface memory, each of the object surrogates including an identifier for a given one of the objects storm in the object memory to be associated with one or more of the memory allocation slots;

(c) creating a surrogate reference and storing said surrogate reference in said one or more of said memory allocation slots, the surrogate reference associating said one or more of said memory allocation slots with one of the object surrogates;

(d) redefining one or more of said memory allocation slots by erasing the surrogate reference and storing a new surrogate reference in its place, so that said one or more of said memory allocation slots are associated with another one of the object surrogates;

(e) determining if any given one of the object surrogates is no longer associated by any surrogate reference with any of said memory allocation slots, informing the second program of the identifier in the given one of the object surrogates when the given one of the object surrogates is no longer associated by any surrogate reference with any of said memory allocation slots, and erasing the unassociated object surrogate.

10. The method as claimed in claim 9, wherein the step of informing the second program comprises sending the identifier within the given one of the object surrogates to an object manager resident within the second program.

* * * * *